(12) United States Patent
Hazelhurst

(10) Patent No.: US 8,498,914 B2
(45) Date of Patent: Jul. 30, 2013

(54) METHOD AND SYSTEM FOR INCREASING CLIENT PARTICIPATION IN A NETWORK-BASED BILL PAY SERVICE

(75) Inventor: Peter Alexander Hazelhurst, Foster City, CA (US)

(73) Assignee: Yodlee Inc., Redwood City, CA (US)

( * ) Notice: Subject to any disclaimer, the term of this patent is extended or adjusted under 35 U.S.C. 154(b) by 464 days.

(21) Appl. No.: 11/768,358

(22) Filed: Jun. 26, 2007

(65) Prior Publication Data

US 2008/0275816 A1 Nov. 6, 2008

Related U.S. Application Data

(60) Provisional application No. 60/915,168, filed on May 1, 2007.

(51) Int. Cl.
*G06Q 40/00* (2012.01)

(52) U.S. Cl.
USPC .............................................. 705/35; 705/40

(58) Field of Classification Search
USPC ...................................................... 705/40, 35
See application file for complete search history.

(56) References Cited

U.S. PATENT DOCUMENTS

| | | | | |
|---|---|---|---|---|
| 7,370,014 | B1 * | 5/2008 | Vasavada et al. ............... | 705/40 |
| 2004/0088253 | A1 * | 5/2004 | Crispyn et al. ................. | 705/40 |
| 2004/0210520 | A1 * | 10/2004 | Fitzgerald et al. ............. | 705/40 |

OTHER PUBLICATIONS

Young, Deborah, "Consolidated billing"; Wireless Review, v17n19, pp: 44-49, Oct 1, 2000; ISSN: 1099-9248.*

Fest, Glen, "Bill Pay: Burn to Bloom: Is Profit in the offing? . . . "; Bank Technology News; v19, n8, p. 28, Aug. 2066, ISSN: 1060-3506.*

Amiercan Bankder, "Patent for Bankless Bill Payment System?"; Newspaper; Mar. 15, 2005; ISSN: 0002-7561.*

* cited by examiner

*Primary Examiner* — Lalita M Hamilton
*Assistant Examiner* — Edward Chang
(74) *Attorney, Agent, or Firm* — Donald R. Boys; Central Coast Patent Agency, Inc.

(57) ABSTRACT

In a network-based bill pay service including a navigating software for emulating a client in network navigation, a software application for collecting and normalizing client data, and a network interface for presenting the information to the client, a method for increasing the level of client participation in the service includes steps (a) navigating to a client site; (b) accessing and mining client data for payee account data; (c) analyzing the mined payee account data for fullness of information and if required searching and adding new relevant information to the payee account data; (d) formatting the payee account data into an interactive bill pay account module; and (e) presenting the bill-pay service option and the bill pay account module relative to the payee account data to the client as an opportunity.

14 Claims, 3 Drawing Sheets

METHOD AND SYSTEM FOR INCREASING CLIENT PARTICIPATION IN A NETWORK-BASED BILL PAY SERVICE

CROSS-REFERENCE TO RELATED APPLICATIONS

The present application claims priority to a U.S. provisional patent application Ser. No. 60/915,168 entitled "Method for Improving Payment Processing" filed on May 1, 2007, disclosure of which is incorporated herein at least by reference.

BACKGROUND OF THE INVENTION

1. Field of the Invention

The present invention is in the area of financial transactions, and pertains more particularly to a method and system for motivating consumers to pay bills electronically through a semi-automatic account acquisition system and service set up for authorizing users.

2. Discussion of the State of the Art

It is well known that there are many ways that a person may pay a bill. Historically and traditionally, for example, a company, having transacted with a consumer for a product or a service, will send a paper bill by mail to that consumer, detailing the transaction and the amount due, plus the due date, among possibly other detail. The consumer, hopefully, keeps track of the paper bill, and writes a check against his/her bank account before or on the due date, and sends the check by mail to the company. The company, receiving the check, cashes the check and updates the consumer's record with the company, deleting the obligation.

In the current art there are many other ways that the billing/payment process may be transacted. Companies now often send bills by email, and if the consumer agrees, only by email. Payment may be made by telephone or on-line, using, for example, a credit card. By telephone payments may be posted by direct transfer from a consumer's account to the company's account. A consumer may also leverage on-line bill payment offered by most banks and other financial institutions, simply by setting up a payee configuration, and entering periodically an amount and desired payment date. The bank then pays the bill for the consumer in any one of several ways, such as by machine-generated check, or by direct transfer. Similarly, companies may offer automated telephony bill pay systems for their own clients.

It is also well known that the paper bill, paper check by mail process is by far the most time-consuming and expensive process for financial institutions and consumers, and the process most prone to error. What is needed is a way to motivate more consumers to pay their bills electronically in a way that is least expensive and most convenient for all parties.

SUMMARY OF THE INVENTION

According to an aspect of the present invention, in a network-based bill pay service including navigating software for emulating a client in network navigation, a software application for collecting and normalizing client data, and a network interface for presenting the information to the client, a method is provided for increasing the level of client participation in the service. The method includes the steps (a) navigating to a client site; (b) accessing and mining client data for payee account data; (c) analyzing the mined payee account data for fullness of information and if required searching and adding new relevant information to the payee account data; (d) formatting the payee account data into an interactive bill pay account module; and (e) presenting the bill-pay service option and the bill pay account module relative to the payee account data to the client as an opportunity.

In one aspect, in step (a), the client site is a financial institution where the client banks. In this aspect, in step (b), the client data is a transaction history including bank statements and or check images. In one aspect, in step (b) the payee data includes the payee name, an account number, a payment date, and a payment amount.

In one aspect, in step (a), a login is performed emulating the client by proxy. In one aspect, in step (c), new relevant information is obtained from an in-house generic database containing biller data. In another aspect, in step (c), new relevant information is obtained from a publicly accessible database. In still another aspect, in step (c), the relevant information is obtained from the payee web interface.

In one aspect, in step (d), a software build application is used to assemble the module. In one aspect, in step (e), the module is presented in a client interface and the opportunity is communicated in an electronic message to the client. In another aspect, in step (e), the electronic message is a pop-up message appearing to the client after login to the interface. In yet another aspect, in step (e), the message is an instant message or an email.

According to another aspect of the present invention, a method is provided for adding new clients to a network-based bill pay service. The method includes the steps (a) providing a co branded network-based bill pay service including a navigating software for emulating a client in network navigation, a software application for collecting and normalizing client data, and a network interface for presenting the information to the client to a financial institution having an online banking network and client banking interface, (b) accessing and mining client data for payee account data, (c) analyzing the mined payee account data for fullness of information and if required searching and adding new relevant information to the payee account data, (d) formatting the payee account data into an interactive bill pay account module, and (e) presenting the bill-pay service option and the bill pay account module relative to the payee account data to the client as an opportunity.

In one aspect of the method, in step (b), the client data is a transaction history including bank statements and or check images. In one aspect, in step (a), the service is set up and based at the financial institution and wherein steps (b) through (e) are performed by the financial institution having access to the provider site as a resource for facilitating steps (c) and (d).

In one aspect of the method, in step (a), the service is based at the provider's site and is extended to the financial institution as a client, and wherein steps (b) through (e) are performed by the provider for the institution by proxy.

In still another aspect of the invention, a software application is provided for assembling a new bill-pay account module for a client containing a portion thereof for retrieving payee information from a data repository, and a portion thereof for organizing the information into an electronic form and making it executable.

In one embodiment, the resulting pay module contains form fields populated with payee data, and includes an interface enabling the client to add information to un-populated form fields to complete the module for execution. In this embodiment, the module once executed, causes a bill pay sequence to be performed on behalf of the client.

In one embodiment, the payee data obtained from the repository was collected on behalf of the client from financial records of the client.

BRIEF DESCRIPTION OF THE DRAWING FIGURES

DETAILED DESCRIPTION

In the current art there exist enterprises that provide information collection and aggregation services to persons and other enterprises via, typically, the Internet network. One such company is Yodlee.com, which provides a dashboard-style bill payment service to corporate, small business and individual consumers who contract with the company for those services.

Yodlee provides a service that, in some instances enables a person or enterprise (client) to consolidate many otherwise tedious tasks on-line. For example, a client may list with Yodlee a plurality of financial institutions, such as banks, savings institutions, and so forth, and may provide a profile and configuration information enabling Yodlee to periodically visit the sites on behalf of that client, aggregate information proprietary to the client at those individual sites, and to consolidate (aggregate and/or normalize) the information, and present the aggregated result to the client. In a variation of the service model, a bill payment service is available whereby the company may aggregate billing information from client sites and then pay bills automatically for the client or enable the client then to pay the bills manually from a single interface.

Figure 1:
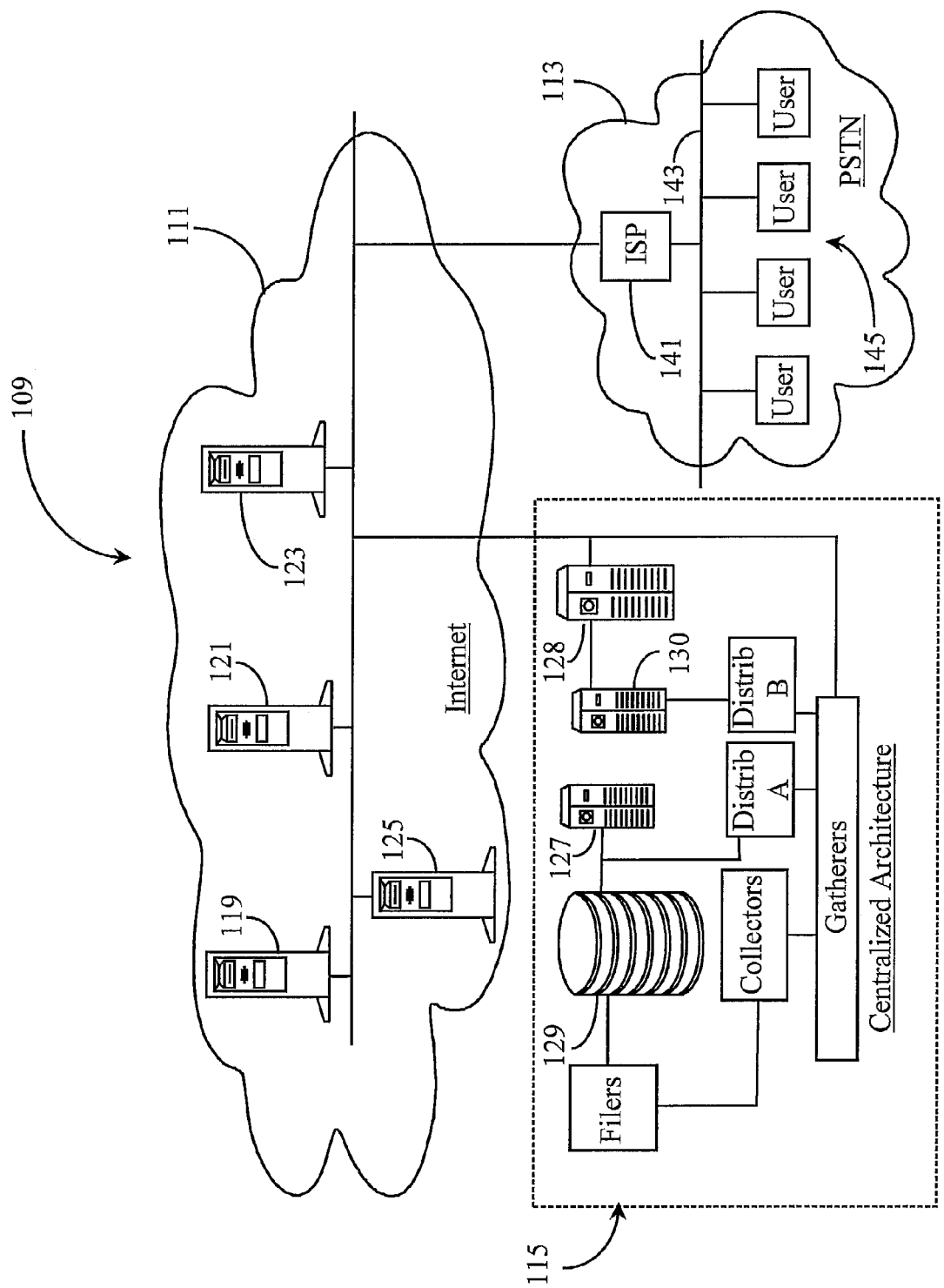
FIG. 1 is an architectural diagram depicting components of a system for practicing semi-automatic account acquisition according to an embodiment of the present invention.

FIG. 1 is an architectural diagram 109 depicting components of a system for practicing semi-automatic account acquisition according to an embodiment of the present invention.

In FIG. 1 individual clients 145 are shown connecting to Internet network 111 through an ISP (dial-up) 141 via a telephone network 113. This is stone age of course, and any electronic appliance capable of Internet interaction may be used, such as a cellular telephone or personal digital assistant. Likewise, the connection method may be broadband, wireless digital, satellite, cable, or other methods of accessing Internet 111.

One element connected to Internet 111 is a centralized system architecture 115 including all of the required components for performing data aggregation services as described further above. Architecture 115 is hosted by a service organization like Yodlee, for example. Architecture 115 may also be referred to herein as service site 115. Service site 115 contains the components that may operate to respond to requests from clients to visit sites and gather information according to a subscribed service agreement and criteria, for example.

Service site 115 includes a robust data repository 129 where updated information may be stored including service data, client data, billing data, and updated information for each subscribing client held in secure and encrypted format. Site 115 includes a network of dedicated servers illustrated herein as servers 127, 128 and 130. These servers execute proprietary software applications adapted to fulfill service goals and requirements.

In one configuration of many possible configurations, server 128 may function as a client's general portal from which they may access services and participate in the process. Server 127 and server 130 are presentation servers connected to data repository 129. Servers 127 and 130 are adapted to distribute requested information into proprietary dashboard style secure software interfaces maintained for each client. In this architecture, specific applications are at work to fulfill the service goals of the company hosting site 115. For example, instances of gatherers, which are programmed Web site navigators, are launched to navigate periodically to each site that the customer has accounts with to pay bills. Web servers 119, 121, 123, and 125 in Internet 111 represent those client sites that may include financial institutions, utility companies, other service sites, and any other online site or service to which clients may do business with.

Instances of collectors, more particularly data collectors work in conjunction with gatherers to collect the pertinent data from each client site such as from servers 119-125. Part of the automated data aggregation process includes automated login to client sites on behalf of the client, the instance of gatherer representing the client by proxy at those sites.

Instances of filers are used to normalize the client data for each client separately from other clients and to file the updated data into the client data repository 129 in a secure and encrypted manner. In process, anytime clients login to their personal interface by connecting to server 128 and providing authentication, the most recent data aggregated for the client is presented or distributed to that client in their interface or to some other interface if the client has ordered and has properly authorized. Thus, the client may access their information by pulling it from the repository or by scheduling a push to them of their information. The info gathered and aggregated is periodically, or in some cases instantly, transmitted in a variety of possible ways to clients 145. The service, described at a rather abstract level, becomes the basis for many other services Yodlee may provide, such as bill paying, financial tracking, net worth assessment and much more.

An important object of the present invention is to motivate clients to modernize in their transactional lives, moving to digital transactions instead of paper transactions, thereby lowering processing costs for the financial institutions they are doing business with, and the clients themselves. In actual practice, privy to site 115, is a robust plurality of clients doing business with a robust plurality of financial institutions. In this light there are a robust plurality of relationships established between those clients and the institutions they patronize.

According to many instances clients such as users 145 post to financial institutions such as made available through servers 119-125 using the services offered by site 115, but still operate also, in many cases with some institutions by older processes and techniques as previously described.

For example, a client may have authorized site 115 to access information for specific bill payment services wherein the service recognizes that the client is actively perusing older bill pay techniques with other institutions such as a utility company, department store, loan company, auto dealers, grocery services, ad infinitum. For example, site 115 may have access to a bank account and records of a client by the client's authorization wherein the check records (provided as digital images) indicate that the client is still writing and mailing checks to various and sundry billers, which may include the types of institutions listed further above.

Noting the architecture and capabilities of site 115, one embodiment of the present invention includes mining the client's check history and developing real and/or at least virtual new accounts for electronic bill pay services. This may be accomplished by scraping the information from the check or checks a client has written to a particular institution such as the account number, the amount paid, and the institution name. The check history may be analyzed to determine if there are repeated payments made to the institution by the client. The scraped information may be used to set-up a virtual account that can be presented to the client for consideration in adding the account to current electronic bill pay services. In one embodiment, the service site may use off-the shelf software to gather the information, although the proprietary software may be preferred because of security enhancements.

The payee information acquired from the check history, in this embodiment, can be used to locate the payee and minimally further investigation can be pursued to gather more general information about the payee such as address, mail box, email, Website, and so on. The more developed payee information can then be used to create a virtual bill payee account module that may be presented to both the client and the institution for consideration.

Since this is a "manual" payee, the payment will gain the benefit of cost containment. The payee module may be presented as part of an integrated service to the client upon their next logon to remind the client that they can use online bill pay services to pay their bills to the payee saving time and lowering costs. The payee may also be solicited, that is the enterprises to which the original checks were written. Such an enterprise might be willing to subscribe to a service that can be demonstrated to get more of their paper paying customers to pay electronically, rather than sending paper checks by mail. Statistical reporting may be instituted and utilized to track conversion success rates at the enterprise and to calculate cost savings as more clients of the enterprise sign-up.

In one embodiment, site 115 already has access to clients that already practice some service level with the site and the present invention is used to semi-automatically acquire new client accounts that fit the bill pay services criteria. For example, if a client of site 115 only uses a financial net-worth tracking service and does not subscribe to bill pay services, then the service may in the course of servicing the client's net-worth status and changes, glean some information about the client's debts to institutions like mortgage institutions and other typical entities the client deals with periodically. In this case, the aggregate of the clients' payees may be developed into a bill pay service package showing the feasibility, and reduced cost for the client, should the client agree to move into the electronic bill pay environment.

In some case where the client is already paying the bills online directly to the institutions, the benefits of accomplishing the task using a single interface may be touted. Cooperation from the payee is not absolutely necessary to practice the present invention because site 115 has the capability of emulating the client with the client's authorization. However, in some cases a payee may also be interested in participating to eventually convert all of their clients to bay electronically.

In one embodiment of the invention, the service is used to help site 115 gain new clients. For example, a financial institution may offer its clients the service touted by site 115 under a co brand arrangement or pursuant to some other agreement. The bank may solicit its clients to allow site 115 to preview their check payment histories and to then develop the virtual payee account modules, which the bank can then present to their clients to authorize finalization of the service. Obviously, check records alone may not provide the entire complete payee data required to activate an account. Site 115 will have to access these sites in general in order to obtain general information. If the clients have password access to payee sites, they can provide those passwords to their bank and the bank can forward them to site 115 to develop those payee modules for activation.

Otherwise, the client may simply provide a record of payment containing the required information if the payee does not have an online presence. Most businesses that accept more than one form of payment maintain online customer care sites and/or telephone access services. The service then may be provided as a turnkey solution for a bank to acquire automatic bill pay services to shop to banking customers whereby site 155 handles the actual logistics and mechanical services.

In an embodiment where a customer has access to a historical record of payment or an invoice history on-line, site 115 may with permission access that information to develop a complete payee account to add to existing payees already set up. Site 115 may utilize general information from all of their clients payees by maintaining it in a universal billers directory so that when a tidbit of payee information is gleaned from a check image, for example, it may be run against the universal database to bring up the rest of the information required to complete the bill pay account module for that biller.

The information gathered can be presented to the client at any opportunity such as when they visit or log into sever 128, for example. A message or pop-up may appear that says "you may now pay your bills at X-company, Y-company, and Z-company online and reducing time and costs, and you may start today. There may be more configuration parameters that must be considered to activate an online bill payee account. For example, the customer may be paying by check although the payee has an online interface. In this case the site may emulating the customer go to the site and register for an online account creating a password and user name for the customer. Then the site may normalize the data for the sites customer interface.

Figure 2:
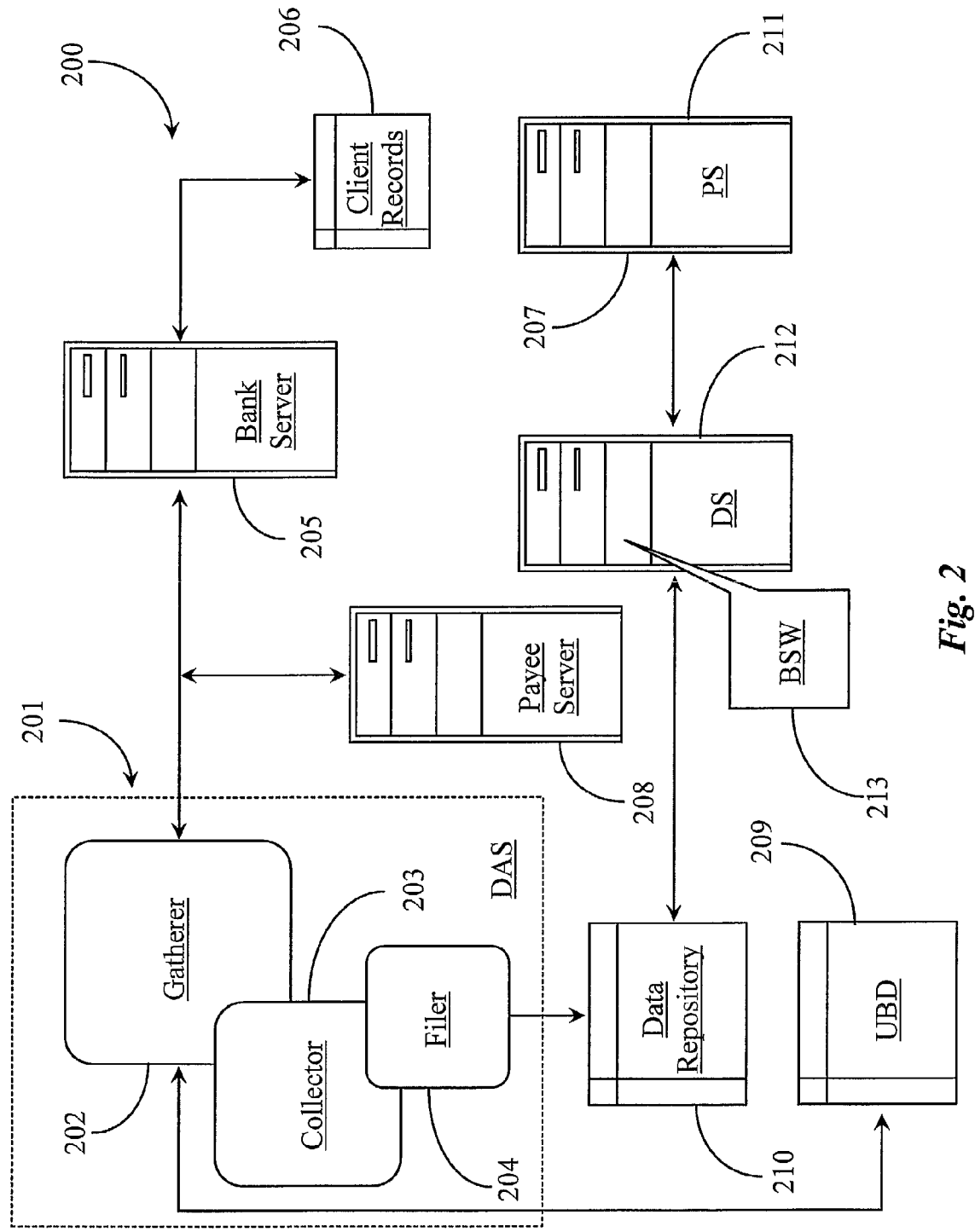
FIG. 2 is a block diagram illustrating an exemplary network of components in place for practicing the invention according to a service model of the present invention.

FIG. 2 is a block diagram illustrating an exemplary network 200 of components in place for practicing the invention according to a service model of the present invention. Network 200 includes a data aggregation server (DAS) 201 enhanced with a data gatherer software 202, a collector instance 203, and a filer instance 204 as known to the inventor. DAS 201 is used to navigate to client Web sites and to aggregate data from those sites for the client. The data aggregated is then formatted and/or normalized by the filer instance 204 and deposited in a data repository 210 for access y or delivery to the client.

In the normal course of business, DAS 201 may be continually operating spawning multiple instances of software to navigate and scrape client data from numerous sites simultaneously. There may also be more than one DAS provided in network 200 depending on scalability requirements.

In this example, an exemplary client site is illustrated herein as a bank server 205 having a connected data repository 206 containing client records and history data. DAS 201 is maintained, in this example, by the service host analogous to architecture 115 described above relative to FIG. 1. In one embodiment, the client is a subscriber to services and the bank server 205 is registered with the service and contains one or more client login interface pages. DAS may already have client permission to log into server 205 to gather data for the client such as periodic reports. DAS may also, in some cases be adapted to perform periodic banking tasks for the client.

According to this arrangement, DAS may have unfettered access to client records such as balance history, check history, and any statement history as part of a service agreement between the client and the data aggregation and presentation service. Hence, the service would have all of the required authentication data to emulate the client at server 205.

In one embodiment of the present invention DAS accesses client records to search for any available data indicating that the client is paying a payee for billed services where the payee is not registered as client bill pay account with the service. More particularly, DAS 201 attempts to discover any payee information that might be mined for the purpose of creating an opportunity for the client to further aggregate their bill paying activities to a single interface. Such a single interface is illustrated herein as portal server 207. Portal server 207 is maintained by the service host and, in this case, is known to the registered client.

Designation of server 205 as a bank server is exemplary only. For discussion purposes, a bank server or other financial institution server may maintain client records such as digital check images of checks the client has written. Other types of e-records available may include electronic transfer histories, financial statements, loan activity histories and the like. Data about a payee the client may be doing business with may show up on check records for example. A check record may include the name of the payee institution or business, the date of payment, the amount of payment and the account number of the payee account.

DAS 201 may access several months of check records to identify instances of repetitive payments to a same payee indicative of a possible bill pay account that may be moved from the client domain into the service domain on behalf of the client. In one embodiment, DAS 201 aided by gatherer 202, collector 203, and filer 204 may acquire relevant payee data from check records for example and deposit that data in normalized format into data repository 210 for the purpose of creating an opportunity for the client.

Data on check records typically does not reveal payee address, website, or other relevant payee information. However, if the payee name is available on the check record then DAS 201 may access a universal biller database (UBD) 209 maintained by the service. It may be that the service has other clients who use the service to automatically pay their bills to the same payee. If so then the complete information on that payee or "biller" is available in UBD 209. DAS 201 may also be adapted to gather data about the payee name from any public database holding such information by searching for the information or directly navigating to a known source where the information might be found.

If the payee has a website and the address is discovered then DAS may navigate to the Website login page of the payee server, illustrated herein as payee server 208, and use the data to build a template for navigation to the site on behalf of the client. If the bill pay service writes paper checks for the client and mails those payments then the check information and the bill pay address is all that is required to pay the bill. The client may simply lists the payees on the bill pay site wherein the client manually pays those payees from the portal interface (207) by clicking on a payee icon or shortcut. The client navigates, by proxy, in this case to the site where the client may perform the actual payment activity. In still another model, the service may wholly emulate the client and use a client account to pay the bills electronically and automatically.

Once the service obtains sufficient information about the payee, it can build a virtual payee that may include most of the information required to pay the bill on behalf of the client. A distribution server (DS) 211 may receive the collected and normalized payee data from data repository 210. A build software (BSW) 212 is provided, in this example, on DS 211 to build a virtual payee account module that may be presented to the client as an opportunity for the client to bring the task of paying that particular payee to the service where it may be automatically paid or where the client may easily access the information to pay the bill from portal server 207.

The virtual payee module may be presented to the client for consideration by any available media like a pop-up offer, an email offer, or an embedded web offer appearing in the client personal interface when the client logs onto PS 207. The virtual payee module may include all of the correct information to pay the bill but may require a password from the client to activate the module if a client login is part of the process of paying that particular payee. In one embodiment, the payee module needs no activation and is complete such that the client may immediately use the module to pay his or her bill. The client may be asked to review the data for accuracy and may be asked to assign an account for the service to use for paying that particular bill.

In one embodiment, build software (BSW) 212 is available as a client tool on portal server 207. In this case, the message may say "click on this message to build a new payee account for "Central Propane", for example. After the client responds, the build software will verify the particulars with the client and enable the client to correct and input information to finish the module. Once complete, the icon may be included in the same list with other registered payees for bill payment. Like other payees, DAS 201 may then navigate to the payee server using the client log-in data if necessary to aggregate the bill pay information periodically as with any other bill pay accounts. Components of BSW 212 may include at least an organizing module that may take payee data and fill it into an executable electronic form having form fields for populating the payee data required to pay the biller. The actual bill pay module may have an interface so that if a client clicks on it, the interface may pop up to solicit any further data needed to complete the module like a password, for example, if the service is to login on behalf of the client and pay the bill electronically.

If the client declines to add the payee or payees to the service, the service may ask the client if they could retain the information and present it at a later time. If the client directs, the information may be deleted and the client may continue to pay the bill manually through an interface separate from portal 207. However, if the presentation calculates costs and time saved for the client when it presents the virtual payee account module, then the client may be more likely to acquiesce to the service addition.

In one embodiment, the service may be offered to a financial institution as a local branded service to enable clients of the bank having no relationship with the service host to automatically pay bills electronically using that bank server interface. Before signing clients, the bank may do the research in client check history or statement history to flesh out the potential payees that may be part of the service. There are many possibilities. Motivation for the bank is that they may charge clients for the service and save money in former processing fees. The benefit to the client is being able to aggregate all of their bill pay tasks into a single Web interface.

According to one possible service model, the service host could negotiate an agreement with the financial institution where they pay the institution and provide the technology to aggregate the payee information for their clients and build the bill pay modules and present them to their clients. Clients that agree to go online and have their bills paid by proxy could then be transferred to the service and could begin the service independently form the bank. The bank is paid to promote the service and the service host gains new clients. An additional benefit for the bank is more streamlined overall processing. The projected cost savings may be enough for the institution to promote the service and do the initial research to collect the payee information and create the opportunity that may then be presented to the banks clients through statement advertising, or through Internet communication.

Figure 3:
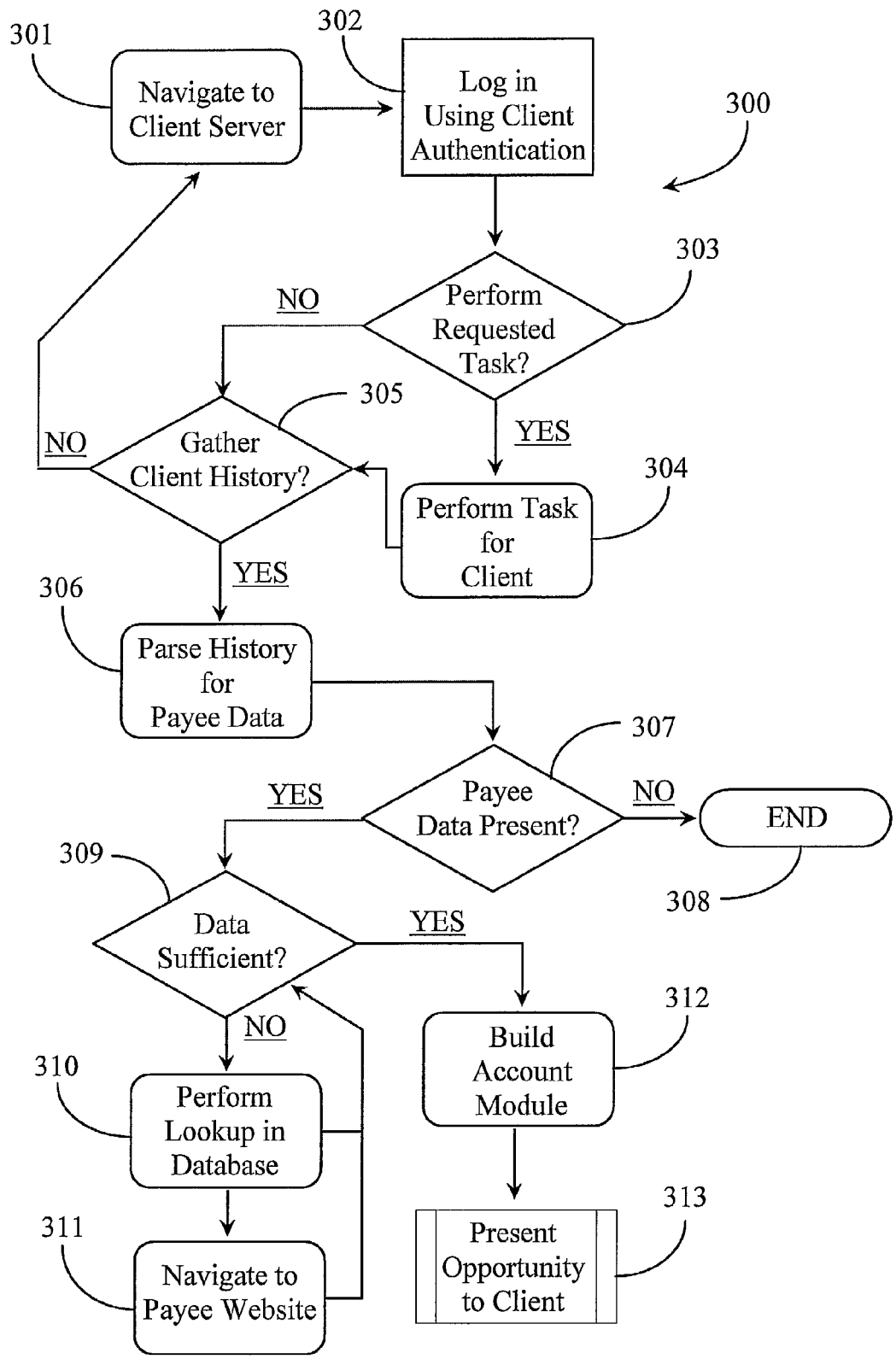
FIG. 3 is a process flow chart illustrating steps 300 for practicing the present invention.

FIG. 3 is a process flow chart illustrating steps 300 for practicing the present invention. This process assumes that the client is already registered with the service host and receives some bill pay or other data aggregation and presentation services. A goal of the process is to increase the client's participation in bill pay services. At step 301, a data aggregation server analogous to DAS 201 described above navigates to a client site such as a banking site, for example. It is also assumed that the service has the proper authentication to log into the client server using the client's credentials.

At step 302, the server logs into the client server emulating the client. At step 304, the system determines if generic tasks will be performed for the client according to an existing service agreement between the service and the client. If the server is to perform one or more tasks for the client as part of an existing order, at step 303, then at step 304 the server may perform the required task or tasks.

If the server determines that an ordered task will not be performed for the client, the service makes a determination at step 305 if it will gather client history to determine if there is any payee data on payees not registered with the service by the client. This determination may also be made immediately after step 304 is performed for the client. In one embodiment, some algorithm may be provided to trigger the determination to look into client history data. For example, if the client has already registered for bill pay services but has not provided any data about payees to the service, the service may decide to aggregate payee data from client history.

In one embodiment, a trigger could be a state where the client receives financial analysis services with the service but not bill pay services. This state may trigger a search into client history for payee data. In still another embodiment, the client may be a registered client receiving bill pay services and the trigger may be time based such as every 6 months history is reviewed for any new payee data.

If at step 305, it is decided that no gathering of history data will be performed, then the process may resolve back to step 301 where the service navigates, perhaps to a next client server in the normal course of obtaining updated summary data for the client. It is assumed in this example, that the service has the proper credentials to log-in on behalf of the client and to access history records emulating the client. In one embodiment the history records may be cancelled check images provided as part of the electronic statement record of client activity. Also in one embodiment, the system of the invention may be adapted to access a telephony server or interactive voice response system to access records emulating the client with the correct authentication procedure and data.

At step 306 if the system decides to access client history records, then at step 306, the server may browse and parse the history for payee data at step 306. This step may be performed by collecting all of the history data and then parsing it at the service site. In one embodiment the parsing capability may be used as the data is browsed wherein only data that proves to be legitimate payee data not already part of the client service portfolio is collected. Rules for collection may include discovery of more than one record having at least an account number and a payee name.

During the process of parsing data it is determined by the system whether there is payee data present in the history or not. The proper payee data will be that data not already incorporated in bill pay services for the client. If no new payee data is present in the history then the process ends at step 308.

If at step 307 there is payee data identified in the records, then at step 309 the system determines whether that data is sufficient for building a virtual payee account module for bill pay services. In an embodiment where the records are cancelled check images, then there probably is not sufficient payee data to complete a module to present to the client.

If the data is insufficient, the data aggregation server may perform a lookup in a universal billers database or equivalent to see if any of the collected payee data can be matched with any current payee data maintained in the database. For example, inputting a payee name may cause a complete payee profile to be returned. Another option is step 310 where the DAS may navigate to the payee website if known to gather additional information. Both steps 310 and 311 are reversible in order.

Step 309 may occur after checking the universal database for known payee information at step 310 and/or after checking for data at the website. After it is determined that the system has sufficient data for presentation to clients, a virtual payee account module may be built for the client at step 312. At step 312 more than one module may be constructed if there was data about more than one payee mined from the records and validated, perhaps by receiving additional matching data from the universal billers database. At step 313, the information may be present to the client. This step can be push or pull, meaning the client may access the information trough the portal or the information may be sent to the client as part of an opportunity message or advertisement.

It will be apparent to one with skill in the art that the system of the invention described herein in several embodiments may be provided using some or all of the mentioned features and components without departing from the spirit and scope of the present invention. It will also be apparent to the skilled artisan that the embodiments described above are exemplary of inventions that may have far greater scope than any of the singular descriptions. There may be many alterations made in the descriptions without departing from the spirit and scope of the present invention.

What is claimed is:

1. An automated service system for soliciting a person to initially subscribe to a bill-paying service, comprising:

an Internet-enabled data aggregation enterprise providing a first service through a first Internet web site and executed by software stored on a computer-readable medium coupled to a server at the web site, the enterprise collecting and aggregating data associated with the person from a variety of sources in the Internet, and providing the aggregated information to the person over Internet connection;

a second service presented as an online bill pay service hosted by a bank providing banking services through a second Internet web site separate from the data aggregation service, the bank hosting a bank account excluding not currently enrolled in an on-line bill-paying service for the person, the person being a client both of the bank and the data aggregation service;

wherein the data aggregation service, with authorization of the person, collects data for the person from the bank account hosted by the bank, determines by a server, from the collected data that the person has not previously subscribed to the second service hosted by the bank, collects further data necessary to initially set up an on-line bill-paying service for the person with the bank, sets up necessary software modules to initiate a new online bill-paying service at the bank for the person, queries the person through the Internet to elect to initially subscribe to the second service hosted by the bank and presents the modules to the person.

2. The system of claim 1, wherein data collected for the person from the bank account hosted by the bank, used in the determination that the person does not subscribe to the second service, is a transaction history including one or both of bank statements and check images.

3. The system of claim 1, wherein data collected for the person from the bank account includes the person's name and account number.

4. The system of claim 1, wherein the further data necessary is obtained from an in-house generic database.

5. The system of claim 1 wherein the further data necessary is obtained from a publicly accessible database.

6. The system of claim 1 wherein the query and modules are presented to the person through the Internet in a pop-up message appearing to the person after login to the data aggregation service.

7. The system of claim 1, wherein the query through the Internet is an instant message or an email.

8. A method for soliciting a person to subscribe to a bill-paying service, comprising the steps of:
   (a) collecting and aggregating by an Internet-enabled data aggregation first service operated by an enterprise through a first Internet web site, and executed by software stored on a computer-readable medium coupled to an Internet connected server, data associated with a person from a variety of sources in the Internet, and providing the aggregated information to the person over Internet connection;
   (b) collecting by the data aggregation service from a bank providing banking services through a second Internet web site separate from the data aggregation service, data for the person from a bank account hosted by the bank for the person;
   (c) determining by a server, from the collected data that the person does not subscribe to an on-line bill paying service provided by the bank;
   (d) collecting further data necessary to initially set up the on-line bill paying service for the person with the bank;
   (e) setting up necessary software modules by a server, to initiate a new on-line bill-paying system at the bank for the person; and
   (f) querying the person through the Internet by a server to elect to initially subscribe to the online bill-paying service of the bank and presents the modules to the person.

9. The method of claim 8, wherein data collected for the person from the bank account hosted by the bank, used in the determination in step (c) that the person does not subscribe to the online bill-paying service, is a transaction history including one or both of bank statements and check images.

10. The method of claim 8, wherein data collected for the person from the bank account includes the person's name and account number.

11. The method of claim 8, wherein the further data necessary is obtained from an in-house generic database.

12. The method of claim 8 wherein the further data necessary is obtained from a publicly accessible database.

13. The method of claim 8 wherein the query and modules are presented to the person through the Internet in a pop-up message appearing to the person after login to the data aggregation service.

14. The method of claim 8 the query through the Internet is an instant message or an email.

* * * * *